United States Patent [19]

Curry

[11] Patent Number: 5,264,943
[45] Date of Patent: Nov. 23, 1993

[54] APPARATUS AND METHOD FOR PROVIDING ACCURATE LAYER REGISTRATION FOR MULTIPLE LAYER ELECTRONIC PRINTING SYSTEMS

[75] Inventor: Douglas N. Curry, Menlo Park, Calif.

[73] Assignee: Xerox Corporation, Stamford, Conn.

[21] Appl. No.: 946,693

[22] Filed: Sep. 18, 1992

[51] Int. Cl.$^5$ .............................................. H04N 1/21
[52] U.S. Cl. .................................... 358/296; 346/108
[58] Field of Search ...................... 346/108, 1.1, 76 C, 346/107 R, 160; 355/200, 202; 358/296, 300, 302

[56] References Cited

U.S. PATENT DOCUMENTS

| | | | |
|---|---|---|---|
| 4,494,865 | 1/1985 | Andrus et al. | 358/300 |
| 4,978,970 | 12/1990 | Okazaki | 346/1.1 |
| 5,179,463 | 1/1993 | Kramer | 359/204 |

Primary Examiner—Mark J. Reinhart
Attorney, Agent, or Firm—Oliff & Berridge

[57] ABSTRACT

An apparatus and method for providing accurate layer registration for multiple layer electronic printing systems discloses a means and a method of reducing the positional scan-to-scan error in a multiple layer electronic printing systems, typically multi-beam laser raster output scanners, in which accurate layer registration is critical. The method comprises determination of a time delay between page sync signal and start-of-scan signal, using this delay to determine delay dependent offset factor called the phase registration parameter, and correctively mapping image data to proper output channels based on the phase registration parameter and the laser number. The phase registration parameter must be determined at the beginning of each scan layer and the offset factors must be re-adjusted based on the new phase delay.

7 Claims, 3 Drawing Sheets

APPARATUS AND METHOD FOR PROVIDING ACCURATE LAYER REGISTRATION FOR MULTIPLE LAYER ELECTRONIC PRINTING SYSTEMS

FIELD OF THE INVENTION

The present invention relates to an apparatus and method for providing accurate layer registration for multiple layer electronic printing systems. More particularly, the present invention relates to a system for reducing the positional scan-to-scan error in a multibeam raster output scanner (ROS).

BACKGROUND OF THE INVENTION

Raster Output Scanners (ROS) conventionally have a reflective, multifaceted polygon which is rotated about its central axis to repeatedly sweep one or more intensity modulated beams of light across a photosensitive recording medium in a line scanning direction while the recording medium is being advanced in an orthogonal, or "process", direction. The beam or beams scan the recording medium in accordance with a raster scanning pattern. Digital printing is performed by serially intensity modulating each of the beams in accordance with a binary sample stream representing the image to be printed, whereby the recording medium is exposed to the image represented by the samples as it is being scanned.

In a four layer printing process, typical for full color applications, the image to be printed will be divided into four color layers. Each layer is representative of one of four system colors, and is exposed on a different layer (in single station applications), or on a different photoreceptor (in multi-station applications).

For multiple beam printing, each beam may be intensity modulated with raster information which corresponds to one scan line of an interlaced representation of the image layer to be printed. Image layers processed for multiple-beam ROSs can be subdivided into a number of sub-images, depending upon the number of beams used in the ROS.

The sub-images, stored in channels, are further subdivided into scan lines. Each scan line represents one raster of image data. The number of scan lines per image layer is dependent upon factors such as resolution, spot size and image size. The number of scan lines reflected per facet of the polygon mirror equals the number of light sources (usually laser diodes) in the ROS, and is referred to as the beam set. Each rotation of the polygon, therefore, will lay down a number of scan lines per facet (corresponding to the number of laser diodes in the beam set) separated by a multiple of the scan spacing.

Interlacing is the introduction of additional scan lines between scan lines already laid down by a previous facet of the polygon. The number of scan lines interspersed between any two scan lines reflected by a single facet of the rotating polygon mirror is the interlace factor and has units of scans per beam. It is because of interlacing that each channel of the image data must be selectively delayed so that it is laid down sequentially on the photoreceptor even though the beam set does not lay down adjacent scans in the photoreceptor during a single facet of the polygon.

As the photoreceptor moves and the polygon rotates through a single facet, the beam set will lay down a number of scans separated by a multiple of the scan spacing. Successive facets will position successive scan lines between scan lines already laid down.

If there are q equally spaced beams in the beam set, then each laser beam could be modulated with information from every qth raster of an image, and in addition, since, in any rasterized image, there are q mutually exclusive sets of such rasters, each laser beam could be associated with its own set of rasters in each channel. This ensures that the superposition of the sets of rasters associated with each laser beam will define the entire image.

Typically, a start-of-scan (SOS) detector is utilized to synchronize the beams to the data rasters in the q channels, and q rasters are output for each scan. Since each scan of the polygon will produce q rasters, the recording medium will be advanced a distance corresponding to q times the reciprocal of the raster density, d, between each start of scan signal.

In order to synchronize the recording medium position with the beginning of the image rasters, a page-sync signal may be produced by a suitable means to signify a particular position of the recording medium (usually the top of page). After that time, but synchronized with SOS, raster information can begin to flow. Since there is generally an asynchronous relationship between page-sync and SOS, the initial image rasters will have a positional error in the process direction corresponding to the distance between q rasters on the photosensitive recording medium. For single layer printing, such as black and white, this may not be a problem, because an image registration error in the process direction of only q rasters may be unnoticeable. However, for multiple layer printing such as color printing, where layer registration is important, a positional error of q/d between layers is unacceptable.

In multiple layer printing applications, the top edge (i.e. top of page or page-sync) signal can occur when a laser diode is coincident with a scan placed by another laser diode in the previous layer. The need to divert data from the same memory channel that drove the laser on the previous layer into this new laser diode requires the channel-to-laser assignments to be switched, and the appropriate delays be generated. The situation is further complicated by the fact that the information, defining which laser diode is coincident with which channel is not available until the top edge synchronization (page sync) signal occurs, so there is little time to effect the change. Suitable means must be provided to measure the laser to channel error, redefine the laser to channel assignment and generate appropriate delays for each layer to be printed.

Therefore, it is understood that the raster positioning precision that is subject to a positioning error of q/d rasters for each layer scanned is unacceptable in multilayer multibeam ROS printing. This error can be reduced to one raster by providing a system that allows for corrective mapping of memory locations and channel assignments of image data, with respect to the delay between the SOS and the page-sync for each layer to be printed.

SUMMARY OF THE INVENTION

It is therefore an object of this invention to provide a multibeam ROS printer with a means for mapping rasters into channels based on the delay between the SOS and the page sync ensuring accurate layer registration in multi-layer ROS printer systems. In order to realize this and other objects of the invention, an apparatus and method are provided wherein an apparatus for scanning a recording medium with a plurality of light beams comprising a beam generating means for generating a plurality of light beams, an optical system for focusing the beams on a surface, modulating means for independently modulating the light beams, an image generator for storing the image data and assigning the data to channels, a programmable delay means for synchronizing the output channels to the light beams, a switching means for assigning the channels to the light beams, a recording medium for recording the modulated light beams, a reflective deflector to deflect the light beams to the recording medium, means for determining the delay between SOS and page sync, and a means for accurately mapping the rasters for proper layer registration for multiple layer printing.

In order to reduce this positional error, a method for mapping comprises expressing the memory raster numbers and channel assignments as a function of laser diode number and phase registration delay. These expressions are then used to provide real time switching of the channel assignments and memory raster numbers to ensure accurate registration by providing the raster number that is positionally best suited for output depending on the photoreceptor position when SOS occurs.

BRIEF DESCRIPTION OF THE DRAWINGS

Further advantages and features of the invention will become apparent when the following detailed description is read in conjunction with the attached drawings, in which.

DETAILED DESCRIPTION OF THE PREFERRED EMBODIMENTS

Figure 1:
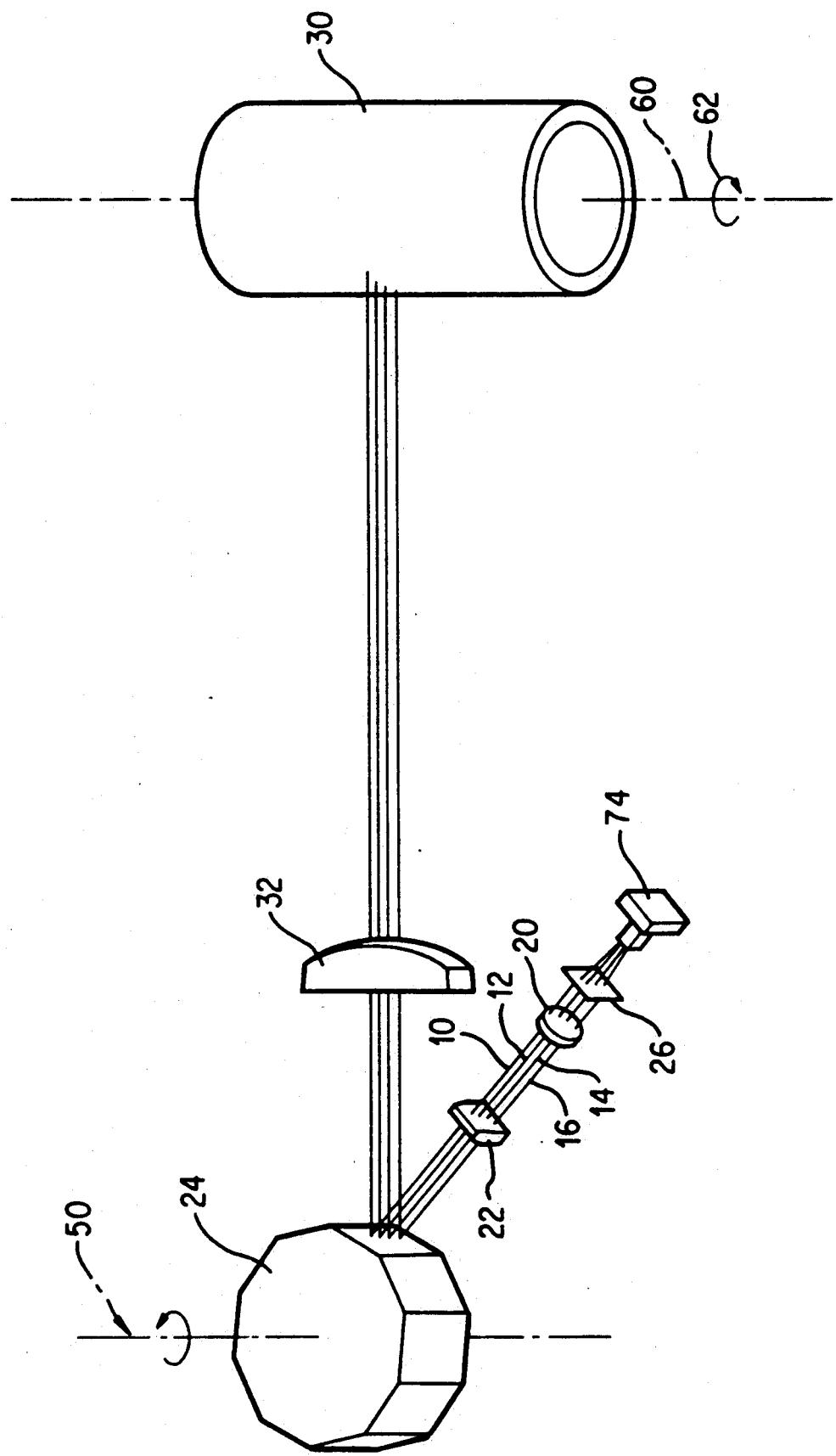
FIG. 1 is a simplified schematic diagram of a laser printer having a multiple spot scanner in which the present invention may be employed.

In FIG. 1, there is shown a conventional multibeam ROS printer (shown only in relevant part) having a reflective multifaceted polygon 24 which is rotated about its central axis 50, by a motor to repeatedly scan multiple incident, intensity modulated light beams 10, 12, 14, 16 in a line scanning direction which is parallel to the central axis of the photosensitive medium 30 denoted by the line 60, across a photosensitive recording medium 30. While being scanned by the light beams 10, 12, 14, 16, the recording medium 30 is advanced (by a means not shown) in an orthogonal direction denoted by the arrow 62, so the light beams 10, 12, 14, 16 expose it in accordance with a raster output scanning pattern representing the image to be printed.

As a general rule, the light beams 10, 12, 14, 16 are supplied by laser diodes housed in a beam generating diode array 74 and are intensity modulated in accordance with data samples representing the image to be printed. The beams 10, 12, 14, 16 generated by the laser diode array 74 pass through an aperture 26 that truncates the beams to their mutually overlapping widths. The beams then pass through a collimator 20 and a cylinder lens 22 that focuses the beams 10, 12, 14, 16 on the polygon mirror 24. The beams 10, 12, 14, 16 are then deflected onto an optical path toward the photosensitive recording medium 30 by the rotating polygon mirror 24. The beams 10, 12, 14, 16 then pass through a corrective optical system 32, which compensates for various beam errors.

Figure 2:
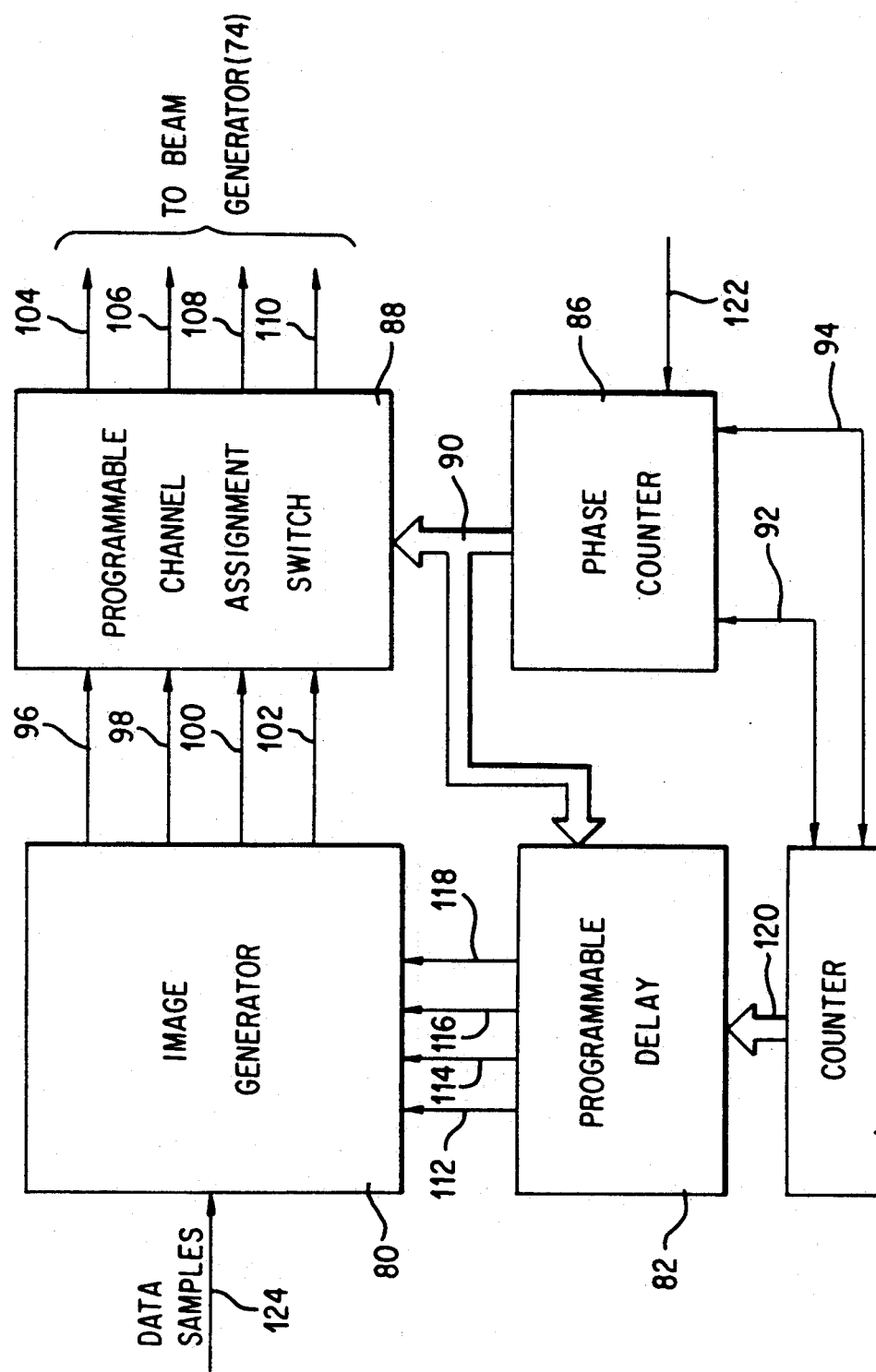
FIG. 2 is a block diagram showing details of illustrating the raster data memory and channel assignment mapping and time delay elements.

Prior to printing, the image to be printed is represented by data in the form of rasters. In FIG. 2, the raster data 124 is sent to the image generator 80, of the type commonly used and well-known in the art. The raster data 124 is assigned to memory locations and then to channels 96, 98, 100, 102 in accordance with a predetermined raster scanning pattern representing the image to be printed. Each channel is independent of the others, and separate raster pointers are utilized in each channel to specify which raster is to be output by each channel. Initially the pointers are all set to zero. After the image generator 80 receives the raster data 124, it receives a delayed line sync signal 112, 114, 116, 118 from the programmable delay 82. Each line sync signal causes each channel that receives a line sync signal to output one raster, and increment its raster pointer. The programmable delay 82 uses a global line sync signal 120 from a counter 84, which generates one line sync signal from each start of scan (SOS) signal 92 after receiving the page-sync signal 94. The programmable delay 82 also uses the phase counter 86, which counts the number of scans (i.e. in increments of 1/d) between the SOS 92 and page-sync 94, to determine how many line sync signals to delay each individual channel so that all rasters are placed in sequential order on the photoreceptor even though the raster are interlaced. The delay generated by the programmable delay 82 is in integer units of line sync signals, and is indicative of the number of scan lines that the recording medium 30 has advanced in the process direction, in the time between page-sync and SOS. The rasters in channels 96, 98, 100, 102 are output by the image generator 80 to the programmable channel assignment switch 88, which assigns the channels 96, 98, 100, 102 to the appropriate laser diodes via signals 104, 106, 108, 110. The switch 88 is a logic device, such as, for example, a programmable logic array. The switch 88 uses data the phase counter 86 to assign the channel-to-laser paths in real time. Each layer can, therefore, be scanned with a maximum positional error of one raster line in the process direction.

Figure 3:
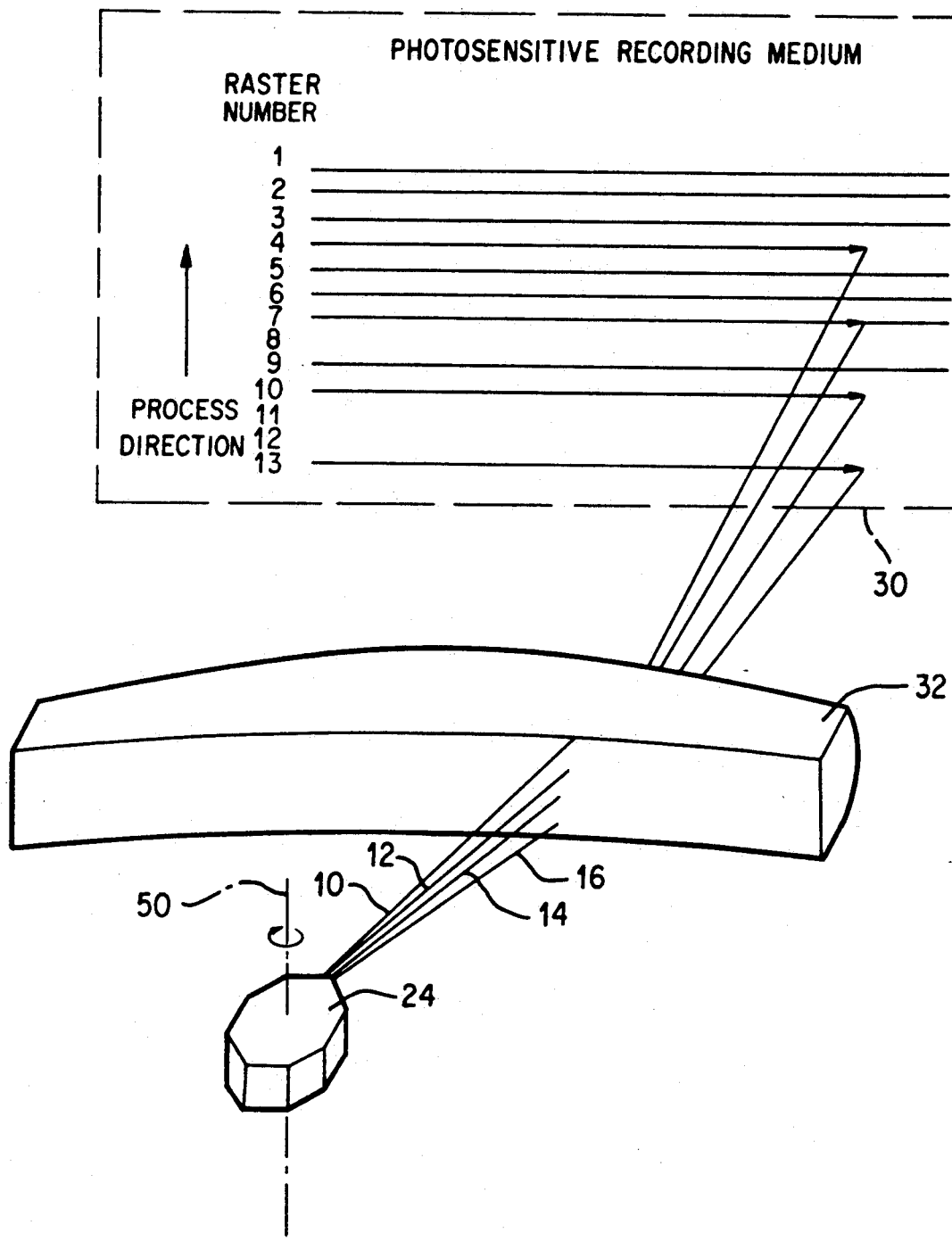
FIG. 3 is a simplified schematic diagram showing a scanning pattern having an interlace factor of 3.

FIG. 3 shows an example of interlaced printing having an interlace factor of 3. In this example, where the interlace factor I is 3, the beams 10, 12, 14, 16 reflected off the polygon 24 pass through the corrective optical system 32 and expose the photosensitive recording medium 30. As the recording medium 30 advances in the process direction, the beams 10, 12, 14, 16 expose the medium 30 with every third raster of the image to be printed. Subsequent rasters in the process direction are then placed in the space between the previously laid down scan lines. Interlacing is used to increase speed and to enhance the resolution of the images to be printed.

In the preferred embodiment, the image generator 80 used to drive such a multiple beam system will typically have q channels which correspond to the raster information required by each of the q lasers. Using known parameters, such as laser diode assignment number, phase registration delay and interlace factor, expressions for raster assignment numbers and channel assignment numbers can be derived. Once derived, these expressions can be evaluated in real time by devices such as, for example, a programmed logic array (i.e., for example, the programmable channel assignment switch 88) that will perform the appropriate switching functions to assign channels to ensure that a particular laser diode is providing the raster number that is best suited for output depending on the photoreceptor 30 position when SOS occurs.

The output channel assignment number, ch, is an integer ranging from 0 to q−1. An integer, m, represents the sequential memory addresses of the individual rasters in a block of memory storing a particular set of raster information corresponding to q raster lines of information. L, the laser assignment number, designates which of q laser beams is being addressed. The laser assignment number L ranges from 0 to q−1. The phase registration parameter, defined in more detail below, is representative of the delay between the page sync and the start of scan signal and has units of scans. The phase registration parameter p ranges from 0 to q−1. I, the interlace factor, is the directed distance, measured in rasters, spanned by any two adjacent light beams of the beam set. r is a constant bias offset for the calculation of R, a variable representing the raster assignment number, both integers. Finally, S is an integer representing the scan number.

A numbering system can be defined that maps rasters into channels and memory locations. Typically, there will be one channel for each laser diode, and each channel will contain enough memory or processing power to provide one of the q mutually exclusive sets of rasters. Channel $\phi$ contains raster $\phi$, channel 1 contains raster 1, ..., and channel (q−1) contains raster (q−1). All these rasters reside in memory location m=$\phi$ of the separate channel hardware. To continue with this mapping scheme, it is convenient to have raster R reside in a channel defined by ch=<mod q>(R), and memory location m=<int q>(R) of that channel (i.e., take R and continuously subtract q from R until no more subtractions may take place without the answer going negative, <int q> is the number of subtractions made and <mod q> is the remainder).

Now scans may be mapped into these hardware related parameters. As shown before, each scan will provide q rasters to q lasers spaced by interlace factor I. If raster r is assigned to laser 0, raster 1xl+r would be assigned to laser 1, raster 2xl+r would be assigned to laser 2, and, in general, raster [L+xl+r] should be assigned to laser number L to properly interlace. Scan $\phi$ can now be defined as the scan that delivers raster r, which will be fixed more precisely later. For subsequent scans, the memory locations for all rasters may be calculated directly by adding S, the scan number, to the values obtained at scan $\phi$. So the mapping of the channel assignment numbers ch and memory locations into hardware is given by:

$$ch = <\text{mod } q>[Lxl+r] \tag{1}$$

$$m = S + <\text{int } q>[Lxl+r] \tag{2}$$

The phase registration parameter, p, may now be used to further qualify these relationships. The phase registration parameter is determined by breaking up the time interval between page sync and SOS based on the number of scans that would be laid down during that period of time. This is accomplished by dividing a time interval equal in length to one SOS-to-SOS time interval (and immediately following the page sync signal) into q equally spaced sub-intervals, and designating each in ascending time, the designation of p=0,1,2, ..., (q−1). By definition, the SOS must occur within one of these sub-intervals. The phase registration parameter p is defined by which one of these sub-intervals the SOS occurs in after the occurrence of the page sync. In other words, p is the time delay, measured in scans, between page sync and the SOS.

When the page sync occurs, a given laser will be poised to output a particular lines of raster date. While waiting for the SOS signal, the recording medium will move a number of raster lines p (as indicated above). Adding p to r will allow the calculated value of R to track the moving recording medium to give one raster registration resolution. Scan $\phi$ is now redefined to be the scan that delivers raster r+p. Substituting r+p for r in equations (1) and (2) the equations for the channel assignment and memory location are:

$$ch = <\text{mod } q>[Lxl+r+p] \tag{3}$$

$$m = S + <\text{ini } q>[Lxl+r+p] \tag{4}$$

Now these equations must be evaluated in real time since p is defined at page sync time for each scan layer. Once evaluated, a programmable channel assignment switch, such as, for example a programmed logic array, that performs the appropriate channel switching and memory assignments, as required, by equations (3) and (4), can be provided.

Note that the parameter r may be assigned in advance to allow for appropriate printing of the top margin, and to ensure that no image rasters are skipped due to interlacing. Assuming that memory locations with a negative raster number are non-printing, r can be selected as a negative number to ensure that the raster numbers are negative until printing of the actual image is desired.

In view of the foregoing, it will be understood that the present invention provides a means and method for reducing the positional scan-to-scan error in multiple layer printing systems, thereby providing increased raster positioning precision, in multiple layers, by permitting channel assignments and memory locations for image rasters as a function of laser assignment number and a phase registration parameter in real time according to the mapping scheme and hardware provided.

While this invention is described in some detail herein, with specific reference to certain illustrated embodiments, it is to be understood that there is no intent to be limited to those embodiments. On the contrary, the aim is to cover all modifications, alternatives and equivalents falling within the spirit and scope of the invention as defined by the claims.

What is claimed is:

1. An apparatus for scanning a recording medium with a plurality of light beams, the apparatus comprising:

a light beam generator for generating a plurality of light beams;

an optical system for focusing said light beams on a surface to be scanned;

a plurality of modulators for independently modulating said light beams in accordance with data samples;

an image generator for storing said rasters and outputting said rasters to a plurality of output channels;

a controller for generating a delay for synchronizing said plurality of output channels to said light beams;

a programmable switch for dynamically connecting said output channels to said light beams;

recording means for recording said modulated light beams;

a reflector for deflecting said light beams onto said recording means; and means for determining a phase registration delay.

2. The apparatus of claim 1, wherein said light beam generator is a plurality of laser diodes.

3. The apparatus of claim 1, wherein said recording medium is a photoreceptive surface.

4. The apparatus of claim 1, wherein said reflector is a polygon mirror rotatably mounted on a central axis.

5. The apparatus of claim 1, wherein said programmable switch is a programmed logic array device.

6. A method of printing an image by multibeam raster output comprising the steps of:

generating a plurality of light beams;
focusing said beams on a surface to be scanned;
arranging said image into layers based on the number of layers to be scanned;
arranging said layers into sub-images based on a number of scanning beams;
arranging said sub-images into data defining a plurality of output scan lines;
storing rasters in a memory;
assigning said rasters to data channels;
synchronizing said data channels to said light beams;
independently modulating said beams in accordance with data samples said data samples defining said output scan lines;
deflecting said light beams onto a recording medium;
determining a phase registration delay in terms of scans; and
determining a mapping scheme for storing said output scan lines in a memory and assigning said output scan lines to said data channels and adjusting said mapping scheme in real time to provide accurate registration of subsequent layers on said recording medium.

7. The method of claim 6, wherein:

m is a memory location of a set of output scan line data stored in an image generator;

ch is an output channel assignment for said set of output scan line data; and said mapping scheme holds the following relation:

$$m = S + <\text{int } q>(L \times l + r + p)$$

$$ch = <\text{mod } q>(L \times l + r + p)$$

wherein, for an image defining S scans, having an interlace factor I, q light sources and a phase registration parameter p, L is a light beam number and r is a constant offset bias;

determining a new phase registration, p, for each layer to be scanned at the beginning of each scan;

reevaluating said mapping scheme in real time for each layer to be scanned using the new phase registration; and repeating the steps in this claim for each layer scanned.

* * * * *